United States Patent
Bartov et al.

(10) Patent No.: US 10,942,250 B2
(45) Date of Patent: Mar. 9, 2021

(54) POSITIONING SYSTEM

(71) Applicant: Rosemount Inc., Shakopee, MN (US)

(72) Inventors: Avishai Bartov, Hod-Hasharon (IL); Yossi Zlotnick, Ramat-Hasharon (IL)

(73) Assignee: ROSEMOUNT INC., Shakopee, MN (US)

(*) Notice: Subject to any disclaimer, the term of this patent is extended or adjusted under 35 U.S.C. 154(b) by 0 days.

(21) Appl. No.: 15/416,004

(22) Filed: Jan. 26, 2017

(65) Prior Publication Data
US 2017/0131383 A1 May 11, 2017

Related U.S. Application Data

(63) Continuation-in-part of application No. 14/493,730, filed on Sep. 23, 2014, now Pat. No. 9,557,402.
(Continued)

(51) Int. Cl.
*G01S 5/14* (2006.01)
*G01S 5/02* (2010.01)
(Continued)

(52) U.S. Cl.
CPC ............... *G01S 5/14* (2013.01); *G01S 5/021* (2013.01); *G01S 5/0226* (2013.01);
(Continued)

(58) Field of Classification Search
CPC . H04M 2250/12; H04W 88/02; H04W 88/06; H04W 88/08; H04W 64/00; H04W 4/02; H04B 1/005; G01S 15/66; G01S 2015/465; G01S 1/02; G01S 1/022; G01S 1/024; G01S 1/04; G01S 1/042; G01S 1/045; G01S 1/24; G01S 1/72; G01S 1/725
See application file for complete search history.

(56) References Cited

U.S. PATENT DOCUMENTS 5,365,516 A * 11/1994 Jandrell ............... G01S 5/0009
340/991
5,491,670 A 1/1996 Weber
(Continued)

FOREIGN PATENT DOCUMENTS

CN 1841086 10/2006
CN 1841086 A 10/2006
(Continued)

OTHER PUBLICATIONS

Notification of Transmittal of the International Search Report and the Written Opinion of the International Searching Authority from PCT/US2015/017720, dated Oct. 7, 2015.
(Continued)

*Primary Examiner* — George Eng
*Assistant Examiner* — Umair Ahsan
(74) *Attorney, Agent, or Firm* — Westman, Champlin & Koehler, P.A.

(57) ABSTRACT

An ultrawide band two-way ranging based positioning system includes a number of active tags each having a position, and a number of beacons configured for location of a position of a tag of the plurality of active tags. The active tags and the beacons are synchronized continuously to a common time base.

19 Claims, 5 Drawing Sheets

Related U.S. Application Data

(60) Provisional application No. 62/335,199, filed on May 12, 2016, provisional application No. 61/946,987, filed on Mar. 3, 2014.

(51) Int. Cl.
| | |
|---|---|
| *H04W 56/00* | (2009.01) |
| *G01S 5/30* | (2006.01) |
| *G01S 11/16* | (2006.01) |
| *G01S 13/76* | (2006.01) |
| *G01S 13/87* | (2006.01) |
| *G01C 21/20* | (2006.01) |

(52) U.S. Cl.
CPC ............. *G01S 5/0257* (2013.01); *G01S 5/30* (2013.01); *G01S 11/16* (2013.01); *G01S 13/765* (2013.01); *G01S 13/878* (2013.01); *H04W 56/001* (2013.01); *G01C 21/206* (2013.01)

(56) References Cited

U.S. PATENT DOCUMENTS

| | | | |
|---|---|---|---|
| 5,526,357 A | 6/1996 | Jandrell | |
| 5,544,171 A | 8/1996 | Godecker | |
| 6,292,106 B1 | 9/2001 | Solinsky et al. | |
| 6,492,906 B1* | 12/2002 | Richards | G01S 13/42 340/573.1 |
| 7,423,576 B2 | 9/2008 | Sahinoglu et al. | |
| 7,463,194 B1 | 12/2008 | Sahinoglu | |
| 7,463,617 B2 | 12/2008 | Lamance et al. | |
| 7,932,858 B2 | 4/2011 | Laine et al. | |
| 7,995,644 B2 | 8/2011 | Sahinoglu et al. | |
| 8,130,141 B2 | 3/2012 | Pattabiraman et al. | |
| 8,175,613 B2 | 5/2012 | Patil et al. | |
| 8,203,910 B2 | 6/2012 | Zhao et al. | |
| 8,766,794 B2 | 7/2014 | Ferguson et al. | |
| 8,773,309 B2 | 7/2014 | Kawaguchi et al. | |
| 8,792,387 B2 | 7/2014 | Georgis et al. | |
| 8,811,199 B2 | 8/2014 | Nixon et al. | |
| 8,837,307 B2 | 9/2014 | Ekbal et al. | |
| 8,912,949 B2 | 12/2014 | Hirata et al. | |
| 9,397,817 B2 | 7/2016 | Park | |
| 9,557,402 B2 | 1/2017 | Bartov et al. | |
| 2005/0002481 A1 | 1/2005 | Woo et al. | |
| 2006/0029009 A1* | 2/2006 | Alapuranen | G01S 5/0289 370/310 |
| 2006/0133556 A1 | 6/2006 | Sarkar | |
| 2007/0162185 A1* | 7/2007 | McFarland | G01S 5/0289 700/258 |
| 2008/0018521 A1 | 1/2008 | Sahinoglu et al. | |
| 2008/0032705 A1 | 2/2008 | Patel et al. | |
| 2009/0070797 A1 | 3/2009 | Ramaswamy | |
| 2009/0190441 A1 | 7/2009 | Zhao et al. | |
| 2009/0201850 A1 | 8/2009 | Davis et al. | |
| 2009/0295639 A1* | 12/2009 | Zhao | G01S 5/30 342/387 |
| 2010/0109849 A1 | 5/2010 | Wang et al. | |
| 2010/0172339 A1 | 7/2010 | Duan et al. | |
| 2010/0290359 A1 | 11/2010 | Dewey et al. | |
| 2011/0110242 A1 | 5/2011 | Nixon | |
| 2012/0087272 A1 | 4/2012 | Lemkin et al. | |
| 2013/0050080 A1 | 2/2013 | Dahl | |
| 2013/0057434 A1 | 3/2013 | Krasner et al. | |
| 2013/0057436 A1* | 3/2013 | Krasner | G01S 19/11 342/464 |
| 2015/0091702 A1* | 4/2015 | Gupta | G06K 7/10207 340/10.4 |
| 2015/0234033 A1 | 8/2015 | Jamieson | |
| 2015/0247916 A1 | 9/2015 | Bartov et al. | |
| 2015/0268327 A1 | 9/2015 | Neukirch | |

FOREIGN PATENT DOCUMENTS

| | | |
|---|---|---|
| CN | 1963561 | 5/2007 |
| CN | 101498781 | 8/2009 |
| CN | 101526601 | 9/2009 |
| CN | 101592727 | 12/2009 |
| CN | 102204396 | 9/2011 |
| CN | 102714855 | 10/2012 |
| CN | 103648164 | 3/2014 |
| CN | 103947280 | 7/2014 |
| CN | 204439827 | 7/2015 |
| CN | 104898090 | 9/2015 |
| EP | 1992964 A2 | 11/2008 |
| EP | 1992964 A3 | 2/2011 |
| JP | 05-297117 H | 11/1993 |
| JP | H07-502153 | 3/1995 |
| JP | 2006-507500 | 3/2006 |
| JP | 2007-501383 | 1/2007 |
| JP | 2008-026310 | 2/2008 |
| JP | 2009-505060 | 2/2009 |
| JP | 2009288245 A | 12/2009 |
| JP | 2010-175535 | 8/2010 |
| JP | 2010-204028 | 9/2010 |
| JP | 2010-213279 | 9/2010 |
| JP | 2011-080946 | 4/2011 |
| JP | 2011-232043 | 11/2011 |
| JP | 2013-510307 | 3/2013 |
| JP | 2013-533956 | 8/2013 |
| JP | 2013-195405 | 9/2013 |
| RU | 2008 119 347 | 11/2009 |
| RU | 2 383 898 | 3/2010 |
| RU | 2011 120 814 | 11/2012 |
| WO | 9304453 A1 | 3/1993 |
| WO | WO 01/73710 | 10/2001 |
| WO | WO 2008/065691 | 6/2008 |
| WO | WO 2015/047986 | 4/2015 |
| WO | WO 2015/134269 | 9/2015 |

OTHER PUBLICATIONS

"The Cricket Location-Support System", by Nissanka Priyantha et al., Proceedings of the 6th Annual International Conference on Mobile Computing and Networking, Aug. 2000.

"An Advertising Supplement to Control Wired & Wireless HART Communication", Putman Media, Sep. 2013.

Invitation to Pay Additional Fees and, Wnere Applicable, Protest Fee and Partial International Search, from PCT/US2015/017720, dated Jun. 9, 2015.

Office Action from Chinese Patent Application No. 201410738708.7, dated Jan. 10, 2017.

Office Action from U.S. Appl. No. 14/493,730, dated Feb. 16, 2016.

Office Action from U.S. Appl. No. 14/493,730, dated Jun. 23, 2016.

Second Office Action from Chinese Patent Application No. 201410738708.7, dated Sep. 13, 2017, 16 pages.

Rejection Notice from Japanese Patent Application No. 2016-555495, dated Aug. 2, 2017, 10 pages.

Invitation to Pay Additional Fees from PCT/US2017/030508, dated Aug. 24, 2017, 12 pages.

Notification of Transmittal of The International Search Report and The Written Opinion of The International Searching Authority from PCT/US2017/030512, dated Sep. 8, 2017, 13 pages.

Priyantha et al, "The Cricket Location-Support System", Proceedings of the Sixth Annual ACM/IEEE International Conference on Mobile Computing and Networking, pp. 32-43, dated Aug. 1, 2000, 12 pages.

"Wireless Medium Access Control (MAC) and Physical Layer (PHY) Specifications for Low-Rate Wireless Person Area Networks (LR-WPANs)", IEEE Stand for Information Technology—Telecommunications and Information Exchange Between Systems—Local and Metropolitan Area Networks—Specific Requirements, dated Jan. 1, 2003, 13 pages.

"Low-Rate Wireless Personal Area Networks (LR-WPANs)", IEEE Standard for Local and Metropolitan Area Networks, 802.15.4-2011, 1-314, dated Sep. 5, 2011, 314 pages.

(56) References Cited

OTHER PUBLICATIONS

Office Action from Chinese Patent Application No. 201720524582.2, dated Mar. 14, 2018.
Office Action from Japanese Patent Application No. 2016-555495, dated Mar. 22, 2018.
Office Action from Chinese Patent Application No. 201410738708.7, dated Mar. 30, 2018.
First Office Action from Chinese Patent Application No. 201720524582.2, dated Nov. 20, 2017, 3 pages.
First Office Action from Chinese Patent Application No. 201720524635.0, dated Nov. 20, 2017, 2 pages.
Communication pursuant to Rules 161(1) and 162 EPC from European Application No. 15709589.4, dated Nov. 10, 2016, 2 pages.
International Search Report and Written Opinion from International Patent Application No. PCT/US2017/030508, dated Dec. 20, 2017, 19 pages.
Office Action from U.S. Appl. No. 15/416,017, dated Sep. 7, 2018.
Office Action from Japanese Patent Application No. 2016-555495, dated Oct. 17, 2018.
Communication from European Patent Application No. 17733198.0, dated Dec. 12, 2018.
Communication from European Patent Application No. 17722963.0, dated Dec. 19, 2018.
Reexamination Notification from Chinese Patent Application No. 201710738708.7, dated Jan. 15, 2019.
Office Action from U.S. Appl. No. 15/416,017, dated Apr. 5, 2019.
Office Action from Russian Patent Application No. 2018143829, dated Mar. 6, 2019.
Office Action from Chinese Patent Application No. 201410738708.7, dated May 8, 2019.
Communication from European Patent Application No. 115709589.4, dated Feb. 19, 2019.
First Examination Report from Indian Patent Application No. 201627027925, dated Mar. 28, 2019.
Office Action from Japanese Patent Application No. 2016-555495, dated Oct. 23, 2019.
Office Action from Canadian Patent Application No. 3,023,588, dated Nov. 7, 2019.
Office Action from Chinese Patent Application No. 201710332471.6, dated Nov. 12, 2019.
Examination Report No. 1 from Australian Patent Application No. 2017262491, dated May 1, 2019.
Office Action from U.S. Appl. No. 15/416,017, dated Sep. 19, 2019.
Examination Report from Australian Application No. 2017262492, dated Sep. 16, 2019.
Office Action from Japanese Patent Application No. 2018-559825, dated Feb. 4, 2020.
Office Action from Chinese Patent Application No. 201710332366.2, dated Sep. 18, 2019.
Office Action from Canadian Patent Application No. 3,023,494, dated Oct. 16, 2019.
Office Action from Russian Patent Application No. 2018143828, dated Aug. 9, 2019.
Office Action from Australian Patent Application No. 2017262492, dated Sep. 16, 2019.
Office Action from European Patent Application No. 17733198.0, dated Dec. 12, 2018.
Office Action from Korean Patent Application No. 10-2018-7033848, dated Mar. 10, 2020.
"Wireless Medium Access Control (MAC) and Physical Layer (PHY) Specifications for Low-Rate Wireless Person Area Networks (LR-WPANs)", IEEE Stand for Information Technology—Telecommunications and Information Exchange Between Systems—Local and Metropolitan Area Networks—Specific Requirements, dated Jan. 1, 2003, 680 pages.
Office Action from Japanese Application No. 2018-559835, dated Feb. 12, 2020.
Office Action from Korean Patent Application No. 10-2018-2017033408, dated Mar. 24, 2020.
Examination Report No. 2 from Australian Patent Application No. 2017262491, dated Feb. 6, 2020.
Examination Report from Australian Patent Application No. 2017262492, dated Jun. 12, 2020.
Examination Report from Australian Patent Application No. 2017262492, dated Sep. 9, 2020.
Office Action from Chinese Patent Application No. 201710332366.2, dated Jul. 31, 2020.
Examination Report from Indian Patent Application No. 201827041343, dated Aug. 24, 2020.
Communication from European Patent Application No. 17733198.0, dated Sep. 1, 2020.
Office Action from Chinese Patent Application No. 201710332471.6, dated Jun. 19, 2020.
Office Action from Canadian Patent Application No. 3,023,588, dated Aug. 4, 2020.
Office Action from Indian Patent Application No. 201827041700, dated Jul. 19, 2020.
Office Action from Chinese Patent Application No. 201710332471.6, dated Dec. 21, 2020.

* cited by examiner

POSITIONING SYSTEM

CROSS-REFERENCE TO RELATED APPLICATION

The present application is based on and claims the benefit of U.S. provisional patent application Ser. No. 62/335,199, filed May 12, 2016; the present application is also a Continuation-in-Part of U.S. Ser. No. 14/493,730, filed Sep. 23, 2014, which claims priority to U.S. provisional patent application Ser. No. 61/946,987, filed Mar. 3, 2014, the contents of which are hereby incorporated by reference in their entirety.

BACKGROUND

The present disclosure relates to positioning systems. More specifically, the present disclosure relates to systems used to identify the locations of or track objects in a given area.

A Positioning System (PS) is a network of devices used to wirelessly locate objects or people inside a building or within dense industrial areas. A special design is required since global positioning system (GPS) systems are typically not suitable to establish indoor locations or other crowded locations as they require an unobstructed line of sight to four or more GPS satellites. Microwaves will be attenuated and scattered by roofs, walls and other objects and multiple reflections at surfaces cause multipath propagation serving for uncontrollable errors.

Time of flight (ToF) is the amount of time a signal takes to propagate from transmitter to receiver. Because the signal propagation rate is constant and known, the travel time of a signal can be used directly to calculate distance. Multiple (in GPS at least four satellites) measurements vs. multiple anchor stations can be combined with trilateration to find a location.

As speed of light is $3 \times 10^8$ m/sec, in radio frequency (RF) based systems, inaccuracy in clock synchronization is a key factor of the positioning error. In GPS, ToF generally requires a complicated synchronization mechanism to maintain a reliable source of time for sensors.

In addition, the accuracy of the ToF based methods often suffer from large multipath conditions in localization situations with dense populations, such as indoor locations and industrial environments which can be crowded, which is caused by the reflection and diffraction of the RF signal from objects.

Due to the attenuation and reflections caused by construction materials, it is desirable to have an unobstructed line of sight to at least three anchor points at any location that should be covered by the system. As a result, a larger number of anchor stations are required.

SUMMARY

An ultrawide band two-way ranging based positioning system according to one embodiment includes a plurality of active tags each having a position, and a plurality of beacons configured for location of a position of a tag of the plurality of active tags. The plurality of active tags and the plurality of beacons are synchronized continuously to a common time base.

A method of determining a position of an active tag in a system having an application server and a plurality of fixed location beacons includes, in one embodiment, providing a common time base for the plurality of fixed location beacons, and providing a synchronization message from each of the plurality of fixed location beacons. The active tag is registered to the common time base based on the synchronization message. The active tag is ranged to at least a portion of the plurality of beacons. The active tag reports its position to at least a beacon of the plurality of beacons.

A positioning system according to another embodiment comprises a plurality of active tags and a plurality of fixed position beacons in communication with the plurality of active tags over an ultrawide band two-way ranging based network. Each active tag of the plurality of active tags in the system has a globally designated window for two-way ranging polls between it and at least one of the plurality of beacons. The plurality of beacons accepts two-way ranging polls within the globally designated window. The plurality of active tags report positions within a global reporting time slot.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Figure 1:
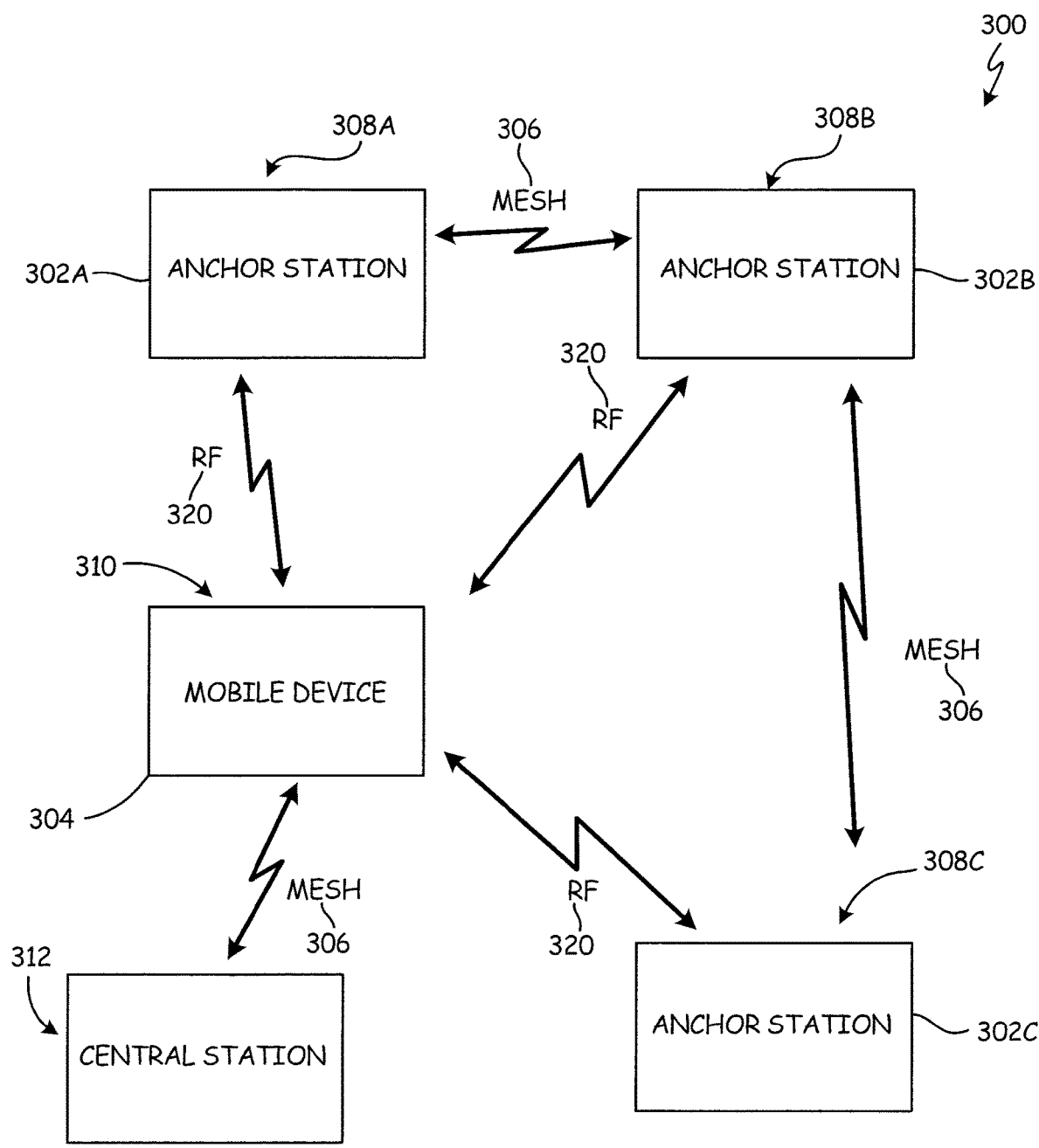
FIG. 1 shows a block diagram of a positioning system in accordance with one embodiment of the present disclosure.

In one specific configuration, the system is based on a commercially proved industrial mesh network such as WirelessHART® network (IEC 62591), and is shown in block diagram form in FIG. 1.

FIG. 1 shows a system 300 having plurality of anchor stations (or "beacons") 302 (three anchor stations 302A, 302B, and 302C shown in FIG. 3, and described in greater detail below) which are disposed in known positions, and a mobile station (also called a "tag", "portable unit" or "PU") 304 (described in greater detail below) for which a position 310 is desired to be determined. Anchor stations 302 are in one embodiment part of a wireless network mesh 306 such as a WirelessHART® network. In operation, the plurality of anchor stations 302 are positioned at known locations 308A, 308B, and 308C around an area to be monitored. A mobile station 304 is located on or in close proximity to an object for which the position 310 is desired to be known. The object may be, by way of example only and not by way of limitation, a piece of inventory or a person.

In one embodiment as shown in FIG. 1, to determine a distance from an anchor station 302 to the mobile station 304, the anchor station 302 transmits an RF message 320 (i.e., a WirelessHART® message). As discussed below, WirelessHART® signals allow for synchronization as they may contain synchronization information, and allow for transmission of data as well as is known in the art. Using this synchronization and data transmission capability allows the RF pulse to be used as a unique synchronization pulse, so that it is possible to know which anchor station 302 or mobile station 304 is transmitting in addition to when the transmission is made. The time difference between transmission of the RF pulse and receipt of a response allows for a determination of the distance between the mobile station and the transmitting anchor station 302. A location for the mobile station may be determined using distance calculations from three separate anchor stations, for example using trilateration.

TDMA is a known standard for sharing a frequency channel on a network, by dividing the signal into multiple time slots. Each station, such as anchor stations 302 described herein, may share the frequency being used for pulses by being assigned a specific time slot for transmissions. In one embodiment, a central station 312, having received information from one or more mobile stations 304 regarding its/their position(s), uses the determined positions to adjust time slotting within TDMA. The central station 312 is used in the system 300, and is connected with the mesh 306 to receive information from one or more mobile stations 304. Time slots for anchor stations 302 are assigned by the central station 312. Any appropriate communication technique may be employed including CDMA techniques or other time and/or frequency slotting or sharing techniques. Alternatively or in addition, the anchor stations 302 may communicate directly with the central station 312.

In one embodiment, location information for one or more mobile stations 304 is used to adjust time slots for the various anchor stations. For example, when a position 310 of a mobile station is closer to some anchor stations 302 than others, the time slots for those anchor stations 302 at a greater distance may be expanded, allowing for pulse propagation and receipt without overlap from other anchor stations 302 due to distance. The central station 312 in one embodiment monitors distances from each line of sight anchor station 302 to each mobile station 304, and adjusts the time slots for the anchor stations according to expected propagation times, to reduce crosstalk between anchor stations 302. Further, pulse coding and different frequencies including spread spectrum techniques may also be used to reduce crosstalk between close anchor stations 302 or other anchor stations.

The anchor system stations 302 are all registered devices on the network 300, so each anchor point 302 is a WirelessHART® device with an RF transmitter 402. In addition, the anchor station 302 contains an optional communication module 404 that may communicate using communication signals 330, and some glue logic 406.

Figure 2:
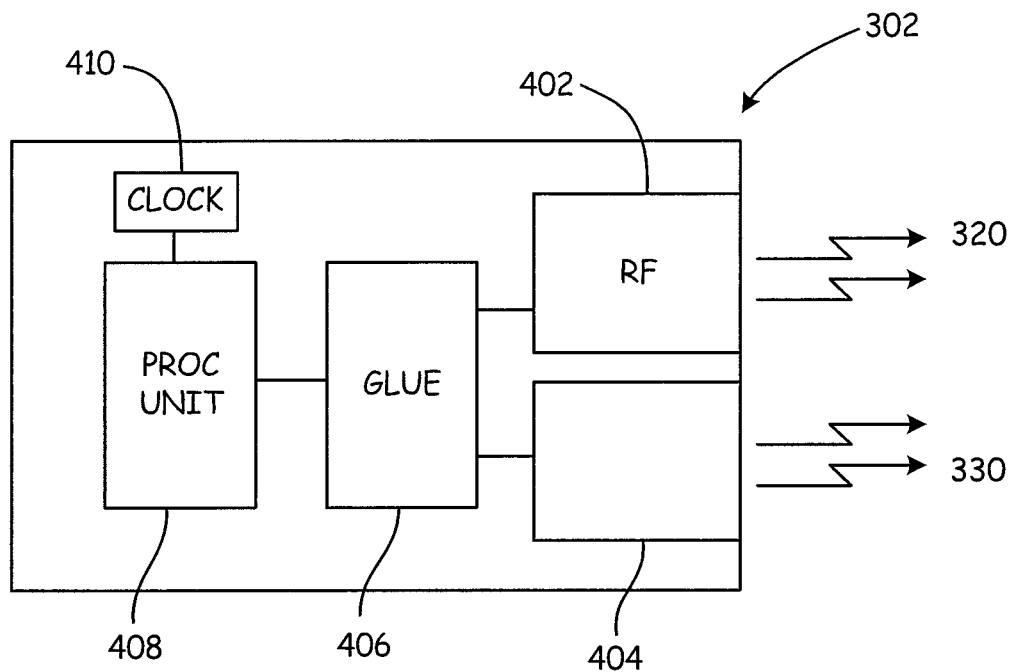
FIG. 2 is a block diagram of an anchor station in accordance with one embodiment of the present disclosure.

Details of an anchor station 302 are shown in FIG. 2. Each anchor station 302 includes in one embodiment an RF transmitter (i.e., WirelessHART®) 402, communication module 404, glue logic 406 to allow interface between various more complex logic circuits such as the RF transmitter 402 and communication module 404, a processing unit 408, or the like within the anchor station 302, and a clock 410. Glue logic 406 is known in the art and will not be described further herein. Also, WirelessHART® is a known standard for wireless sensor networking based on the Highway Addressable Remote Transducer (HART®) Protocol. In one embodiment, the anchor stations 302 are part of a mesh network of devices, such that each anchor station 302 is a WirelessHART® device on the wireless mesh network 306. Clock 410 is operatively coupled in one embodiment to processing unit 406 to allow processing unit 406 to determine a time of transmission of signals such as RF signal 320. In another embodiment, clock 410 may be a part of processing unit 406.

Figure 3:
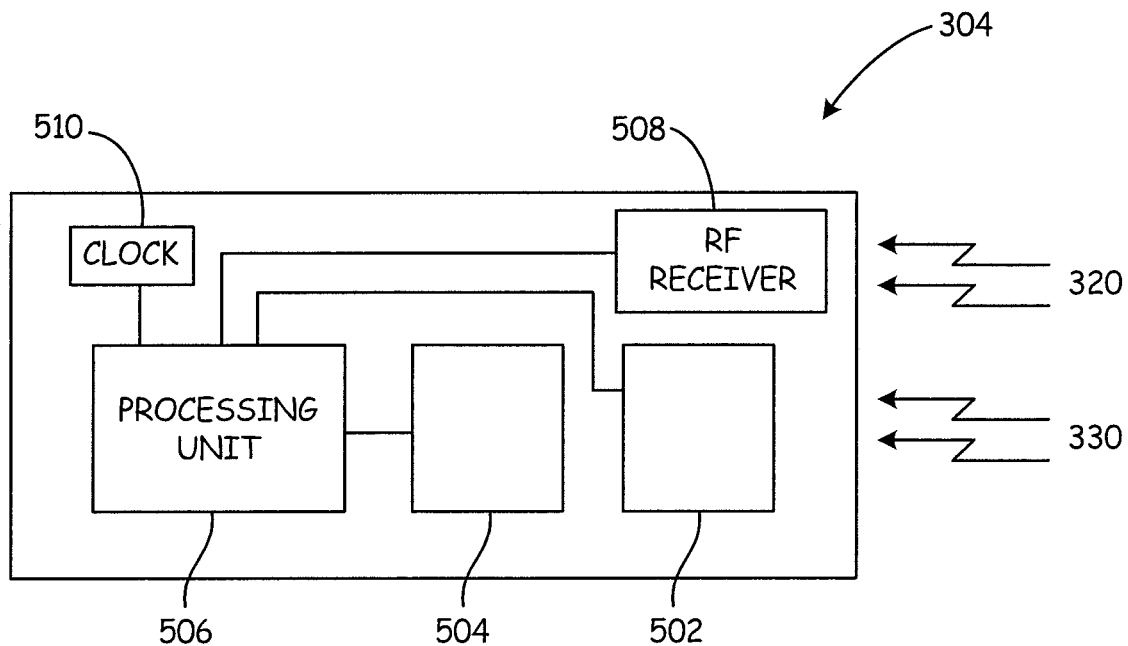
FIG. 3 is a block diagram of a mobile station in accordance with one embodiment of the present disclosure.

As illustrated in FIG. 3, in one configuration, the mobile station 304 is also a WirelessHART® device with an optional communication unit 502, optional GPS unit 504, a small processing unit 506, and an RF receiver 508.

The mobile station 304 includes in one embodiment an optional communication module 502, an optional GPS unit 504 for use in outdoor locations, a processing unit 506, an RF receiver 508, and a clock 510. RF receiver 508 is operatively coupled to processing unit 506. Clock 510 is operatively coupled in one embodiment to processing unit 506 to allow processing unit 506 to determine a time of receipt of signals such as RF signal 320. In another embodiment, clock 510 may be a part of processing unit 506.

In order to calculate its positioning, the mobile station 304 measures the distance to at least three anchor stations 302. Three anchor stations 302 allow for adequate determination of position, for example by trilateration, for a mobile station 304 that is in the line of sight of each of the anchor stations 302, but in case there are more anchor points 302 in the area, the redundancy can be used to improve the robustness of the measurement. While three anchor stations 302 (respectively, 302A, 302B, and 302C) are shown in FIG. 3, it should be understood that for complete coverage of an area, additional anchor stations may be used to increase the accuracy of position 310 determination, and to provide more potential line of sight options for all parts of the area to be covered by the system 300. Further, while one mobile station 304 is shown, multiple mobile stations 304 may be disposed within the area to be monitored, and the system 300 may use the same plurality of anchor stations 302 transmitting RF signals to determine multiple locations 310 of multiple mobile stations 304. The mobile station 304 reports the acquired information to a central station 312 via the network 306. The central station 312 may run an algorithm that optimizes the TDMA time slots according the current positions 310 of mobile stations 304 and may modify the network parameters accordingly. Within the mesh network, since locations of anchor stations 302 may be transmitted over the network, anchor stations 302, mobile stations 304 or the central station 312 may, in various embodiments, make a determination of the position of a mobile station 304.

In some situations, position of a mobile station may be determined using fewer than three anchor stations. Such a situation includes by way of example, but is not limited to, where there is some external information known about the mobile station, such as that it is located in a corridor or other known confined area, or where other tracking information is known for the mobile station. In such situations, position may be determined using as few as one anchor station.

A positioning system (PS) is provided in one embodiment in which a network of devices is used to wirelessly locate objects or people inside a building or within dense industrial areas. A system embodiment is provided that does not necessarily rely on GPS for location determination. Further, microwaves will be attenuated and scattered by roofs, walls and other objects especially in an indoor environment. Still further, multiple reflections at surfaces can cause multi-path propagation resulting in uncontrollable errors.

Figure 4:
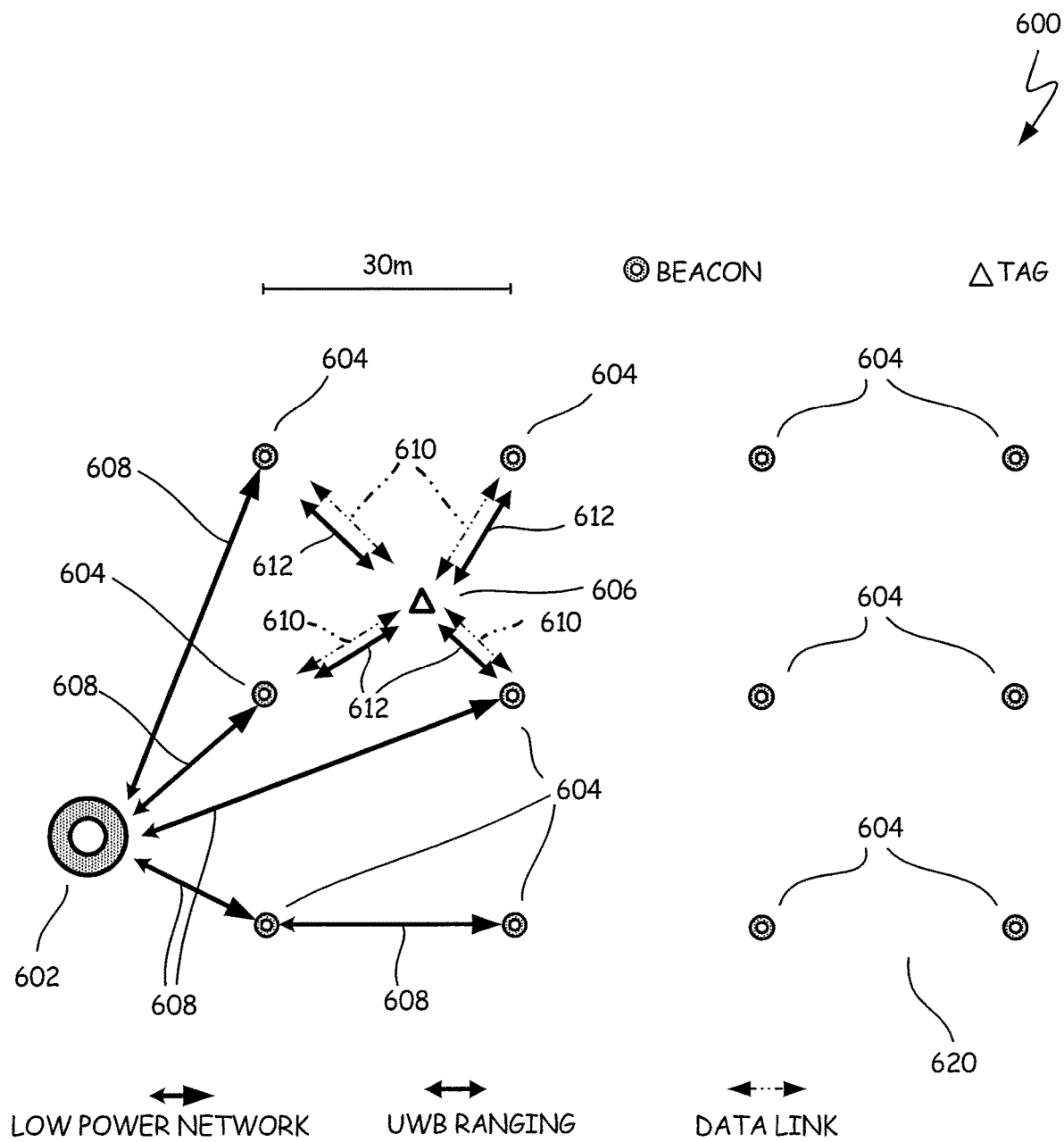
FIG. 4 is a block diagram showing a central location, anchor stations and a mobile station.

An embodiment 600 of a PS using ultra-wide band communication between beacons and tags of a system is shown in block diagram in FIG. 4. PS 600 comprises in one embodiment an application server 602, a plurality of beacons 604, and at least one mobile tag 606. In this embodiment, a tag 606 is a portable component that can be attached to or otherwise carried by persons or equipment that is to be tracked by the system 600. A beacon 604 is a fixed position, static anchor placed at a predefined coordinate of a positioning arena or area 620. In one embodiment, a plurality of beacons 604, arranged in an array such as that shown in FIG. 4, are positioned in the arena 620 to allow for all locations within the arena 620 to be visible by more than one beacon 604, and preferably by at least three beacons 604. Under some conditions, range measurements from the tag to at least three beacons 604 will provide enough information to determine a position of the tag 606 within the arena 620.

The application server 602 in one embodiment prepares and sends setup and configuration information to the beacons 604. The application server 602 also in one embodiment receives and processes position information for the tag 606, and other information from the beacons 604, for the purpose of displaying the position of the tag 606 to an end user, for archiving, or for any other further analysis. While one tag 606 is shown, it should be understood that many tags 606 may be at positions within the arena 620. The application server 602, in conjunction with the beacons 604, is used in one embodiment to monitor the positions of a plurality of tags 606 within the arena 620. The application server 602 in one embodiment communicates with the beacons 604 via a low power network as indicated in lines 608, described further below.

FIG. 4 is a diagram showing communication between an application server 602, beacons 604, and a portable tag 606. In one embodiment, a wireless network such as a WirelessHART® network is used as a backbone for the positioning system that uses UWB (e.g., IEEE 802.15.4a-2011) for range measurements. The low power network used to communicate with beacons 604 is illustrated at 608, along with the ultra-wide band ranging signal 612 and the data link 610 between a tag 606 and one or more beacons 604. In the example illustrated, beacons 604 are distributed across the facility (e.g., the arena 620) with a spacing of approximately 30 meters.

The beacons 604 communicate with tag 606 in one embodiment along data links illustrated as lines 610 using Ultra-WideBand (UWB) technology as indicated at by UWB ranging signal lines 612. UWB offers the potential of achieving high ranging accuracy through signal time of arrival (TOA) measurements, even in harsh environments, due to its ability to resolve multipath signals and to penetrate obstacles. For example, information related to a separation distance between a pair of nodes A and B in a UWB network can be obtained using measurements of signal propagation delay, or time-of flight (TOF) (1)

$$T_f = \frac{d}{c}$$

where d is the actual distance between the two nodes and c is the speed of electromagnetic waves (c $3*10^8$ m/s). Nodes A and B in various embodiments may be multiple beacons 604, or a beacon 604 and a tag 606, or multiple tags 606. In one embodiment, tags 606 are beacons dedicated to being mobile position locators.

The IEEE 802.15.4a-2011 standard is the first UWB-based standard for low-rate wireless networks with localization capability. However other ultrawide band communication techniques may also be employed.

For example, assume a first node A transmits to a second receiving node B a packet that contains the timestamp $t_1$ at which A's packet was sent. Node B receives the packet at time $t_2$. Under ideal conditions, that is, when node clocks of nodes A and B are perfectly synchronized to a common time reference, time of flight ($T_f$) can be determined at node B as (2) $T_f = t_2 - t_1$. The distance between nodes A and B can be estimated in this one-way ranging using $T_f$. One-way ranging, however, requires very accurate synchronization between nodes that is very difficult to maintain with low cost electronics. For example, a relatively small 10 nsec synchronization error between nodes A and B will yield a 3 meter ranging error.

In practice, TOF estimation is often done with two-way ranging (TWR) (without a common time reference). In TWR, node transmits a packet to node B, which replies by transmitting an acknowledgment packet to node A after a response delay $T_d$. The round trip time ($T_{RT}$) at node A is determined by (3) $T_{RT} = 2T_f + T_d$, which the distance can be estimated assuming $T_d$ is known. Knowing $T_d$ and $T_{RT}$ allows calculation of $T_f$.

In some embodiments, clock accuracy on both tags 606 and beacons 604 is expected to be limited in the range of 1 to 10 parts per million (PPM). Clock inaccuracy may generate a significant difference in $T_d$ between a tag 606 and a beacon 604. For example (see equation 3), for a nominal $T_d$ value of 0.5 msec, a 10 ppm error yields a 5 nanosecond (nsec) $T_{RT}$ error, which is equivalent to approximately a 0.75 meter ranging error.

By definition, UWB (IEEE 802.15.4a-2011 based) TWR sequencing is done between two nodes. Theoretically, (according to the standard) the number of measurement that can be done in parallel (on the same channel) without crosstalk is limited to 2 or 4 depending on the channel.

Due to the attenuation and reflections in some environments, such as those caused by construction materials and the like, it is desirable to have an unobstructed line of sight from a mobile beacon (such as a tag 606) to at least 3 beacons (such as beacons 604) when the mobile beacon/tag is at any location that should be covered by the system 600. As a result, a large number of beacons 604 may be used.

Use of a large number of beacons 604 may put restrictions on the cost of installation of the beacons 604. It is therefore desirable that the beacons 604 be at least partially battery powered, and that the communication (such as on a low power network 608) from beacons 604 to the application server 602 be wireless. In some embodiments, beacons may use other forms of energy, such as that harvested in known ways, for at least a part of their power.

A PS such as system 600 may also employ thousands of tags for determining the positions of items and/or personnel. For positioning updates (according to the system 600's or the tag 606's specific update rate), each of the tags 606 should be involved in at least three TWR sequences with beacons 604 in order to be able to estimate its current position. In general, the measurements rate is a multiplication of the number of tags 606, the measurements per tag 606, and the update rate.

A TWR round trip time is typically on the order of 1 millisecond. For a system with thousands of tags 606 and an update rate on the order of few to tens of seconds, that means that coordination of the TWR measurement is carefully controlled to allow a high number of TWR measurements without crosstalk.

In one embodiment, in a TWR, node B is armed, waiting for a poll from node A. In order to preserve battery life on node B (either tag or beacon), it is desirable that node B will start listening just before system A sends the poll. In one embodiment, an application server such as application server 602 sends scheduling information to the beacons 604, such as to node B, so that the beacons 604 are activated for listening just in time before transfer of a poll. In one embodiment, this is done over the IEEE 802.15.4-2003 compliant network.

It may be desirable that some tags 606 in a system 600 have a lower update rate than others. For example, a tag 606 that is hooked on equipment might operate on a lower update rate than a factory worker, for example if the equipment to which it is attached is less likely to be mobile than the factory worker, or is likely to move within a certain known area, or the like. A system 600 in one embodiment monitors a plurality of tags, and updates at least one tag of the plurality of tags at a rate slower than other tags, depending upon determined conditions of the at least one tag, such as the equipment with which the at least one tag is associated.

Another function of the PS 600 is to continuously transfer information from the beacons 604 to a central application station 602. The data transferred between the beacons 604 and the central application station 602 might be either the raw ranging measurements or the calculated position of a tag 606 (depending on the configuration of the system 600). The information about raw measurements, such as TWR measurements and the like, is in one embodiment, done over the IEEE 802.15.4-2003 compliant network.

In system 600, a system architecture is provided that addresses the challenges of a positioning system 600 for a high number of tags such as tags 606 and beacons such as beacons 604. The system 600 in some embodiments provides one or more advantages. One advantage is efficient coordination of tag/beacon measurements without cross interference in a way that increases the rate of ranging measurements in the system 600. Another advantage is different update rates for different types of tags. Yet another advantage is low power operation, in which an operation sequence for both tags 606 and beacons 604 is designed in a way that reduces power dissipation, and allows tags 606 and/or beacons 604 to hibernate unless action is to be performed. Another advantage is calibration of clock drift between beacons 604 and tags 606 in order to compensate for clock drift between the units' time base.

An architecture for operation on a system such as system 600 is provided in one embodiment as follows:

All beacons 604 operate as nodes on a low power network 608 that provides bi-directional communication between the beacons 604 and the application server 602. In one embodiment, IEEE 802.15.4-2003 is used for this low power network. In one embodiment, the network 608 provides a common time base for all the nodes (i.e., beacons 604) in a way such that the entire system 600 is synchronized in a time period of 1 to a few milliseconds, which can be considered standard requirement for commonly used networks. This timing for synchronization is approximately 6 orders of magnitude lower than what is used for UWB ranging.

The radio data link between tags 606 and beacons 604 may be based on UWB radio 612 or on a dedicated data link 610 that operates in another standard technology. Two way ranging (TWR) is in one embodiment initiated by a tag 606. A tag 606 calculates its position within the arena 620 based on TWR measurements to beacons 604 which are located nearby, or at least which are in line of sight communication with the tag 606. Once a tag 606 determines its position, the tag reports that determined position to a beacon 604. Positions of tags 606 that are reported to beacons 604 are then transferred to the application server 602 via the low power network 608. In one embodiment, each tag 606 maintains a list of beacons 604 and the coordinates of each beacon 604.

Each beacon 604 and each tag 606 in the system 600 has, in one embodiment, a unique system ID. This system ID may be assigned by the central application server 602, and allows for the dissemination of information from the central application server 602 to specific beacons 604 and/or tags 606, as has been described above.

Each tag 606 has in one embodiment a unique active ID. In one embodiment of the system, the active ID is identical to the system ID. In another embodiment, the active ID can be temporal, as part of some registration procedure.

A system such as system 600 in one embodiment has a global cycle time on the order tens of seconds. Every cycle, each of the beacons 604 broadcasts a short synchronization message that includes that beacon's ID and coordinates. The synchronization message is sent in a predefined time slot in the cycle (in one embodiment a predefined offset time from the cycle start time). The predefined time slot for a beacon 604 is assigned in one embodiment by the central application server 602 using an assignment protocol, such as TDMA as discussed herein.

A beacon 604 message time as an offset from a cycle start can be calculated in one embodiment knowing the beacon's ID. With a knowledge of the beacon ID, the predefined offset time is known and can be calculated based on a cycle start time.

Tags 606 in one embodiment are continuously active for detection of all or some of the beacon synchronization messages. Upon receipt of a synchronization message by a tag 606, the tag 606 is in complete synchronization with the beacon 604 clock, and is therefore synchronized to a network global time-base within the network synchronization accuracy range.

In one embodiment, a system 600 uses a global registration window having a length of K time slots. Beacons 604 are active for detection of a tag 606's registration message in this window.

In one embodiment, there are unique global time slots assigned in the cycle for each tag 606 active ID. The unique global time slots include position report message time slots and range measurement slots. In a position report message time slot, a tag 606 reports its last (measured and calculated) position in this time slot. The message reporting the last tag position may be received by one or more beacons 604. In a range measurement slot, a tag 606 may perform range measurement to beacons 604 in its vicinity, or that are within a line of sight of the tag 606. The range measurement slot is a global time slot, in one embodiment in a length of n TWR measurements per tag 606. Following tag 606 registration in the global registration window, beacons 604 are active for detection of tag TWR measurements in this slot. The TWR measurements in one embodiment occur as polls including the range measurements.

Figure 5:
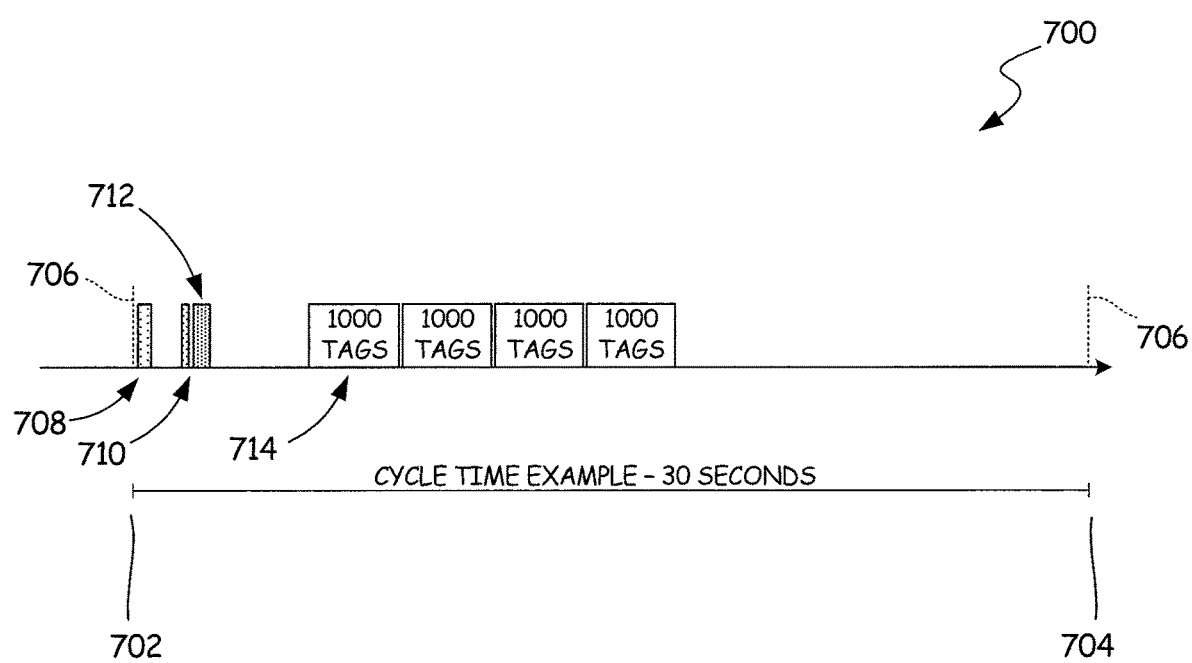
FIG. 5 is a timing diagram showing timing between beacon communication signals and tag positioning reports.

A 30 second cycle time example 700 is shown in graphical form in FIG. 5. Sequences of operation for the various time slots and operations within a cycle 700 are shown. Cycle 700 begins at time 702, and ends at time 704. At time 702, frame start 706 occurs for tag registration. In tag registration, tags 606 are continuously listening at 708 for synchronization messages from beacons 604. In one embodiment, 200 time slots are available for beacon 604 time synchronization. After receiving a beacon 604's synchronization message for the first time, a tag 606 sends a registration message at 710. The message is sent randomly in one of the allotted number of time slots (in one embodiment 100 slots). Upon receiving a registration message, the beacon 604 sends a confirmation message to the tag 606 at 712. In one embodiment, the beacon acknowledgement to tag registration occurs in 200 time slots. The beacons 604 begin listening on the tag position reporting slots at 714 (in one embodiment the tag position reporting time slots are arranged in blocks of 1000 and are sequential).

Range measurements are performed as follows. In range measurement, a beacon 604 is always listening on a registered tag measurements slot 714 for a registered tag poll. A tag 606 may choose to poll for TWR to a specific beacon 604 during this time. That tag 606 can poll to up to n beacons 604 in a single cycle 700.

Figure 6:
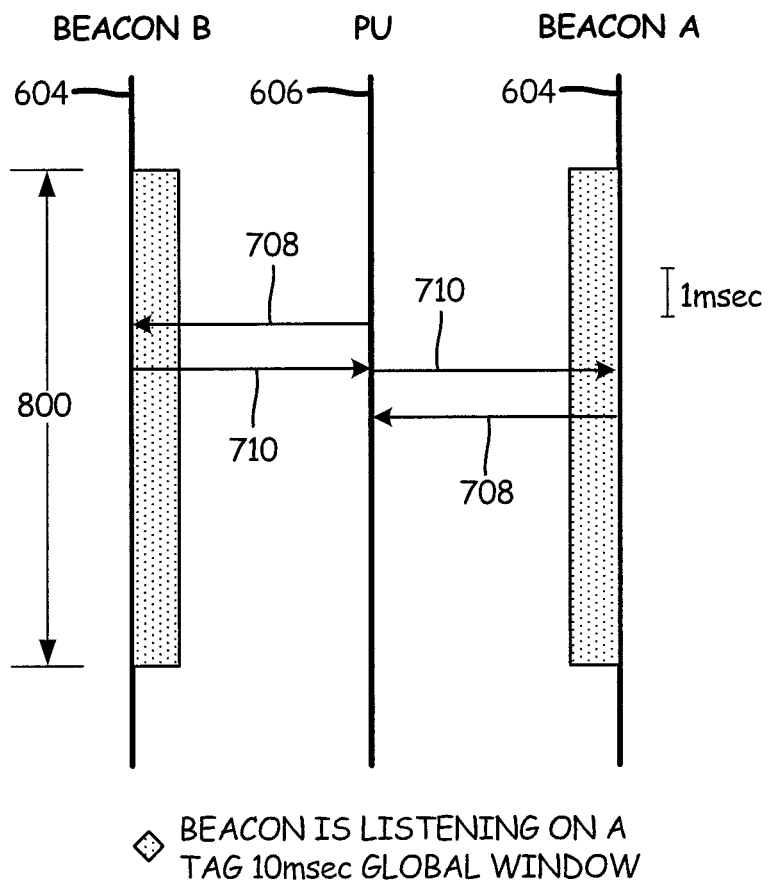
FIG. 6 is a diagram showing two beacons listening on a tag global time slot window.

Beacon 604/tag 606 clock drift compensation is performed in one embodiment to reduce the response delay ($T_d$) error. Both beacon 604 and tag 606 have a systematic clock drift against a network clock. In one embodiment, a sequence for calibrating and compensating for this drift is as follows, using the example shown in FIG. 6, and determining $T_d$ between a portable unit PU (such as a tag 606) and beacon B (such as a beacon 604). Beacon B sends its internal clock count as part of a synchronization message 708 ($B_c^n$) in a cycle n within a global window 800. The PU (e.g., tag 606) logs its internal clock count upon the arrival of the synchronization message ($T_c^n$) in cycle n. The tag 606 calculates a correction factor using equation (4)

$$D = \frac{T_c^n - T_c^{n-1}}{B_c^n - B_c^{n-1}}.$$

This correction factor is used by the tag 606 to correct the time delay $T_{d\ using\ equation}$ (5) $T_{RT}=2T_f+T_d*D$ which replaces equation (3). The corrected time delay compensates for the clock drift, allowing for improved position location for tags 606 in the system 600.

Although the present disclosure has been described with reference to preferred embodiments, workers skilled in the art will recognize that changes may be made in form and detail without departing from the spirit and scope of the disclosure. Embodiments of the present disclosure can be used in indoor, outdoor or hybrid environments. Communication can be in accordance with any standard and is not limited to a mesh network type communication system. The term "RF" refers to radio frequency of any appropriate wavelength. As used herein, the term "anchor" refers to a base transmitter whose location is known and is used as a reference location in determining location. The term "mobile device" refers to the device, such as a mobile station, whose location is being identified. The processing unit which is used to determine location may reside in the mobile station, in one or more of the anchor stations, at a central station, or at some other location.

An optional GPS module such as module 504 shown above, may be provided in a mobile station (such as a tag 606) and may be used when a GPS signal is available. A low power communication protocol (i.e., 608) such as those based on the IEEE 802.15.4-2003 physical layer may be used as a backbone for a positioning system that uses robust ranging achieved through the use of a low power UWB ranging and communications protocol such as those based on IEEE 802.15.4a-2011. However, other ranging and communication protocols and techniques may be used to implement the embodiments of the disclosure. The configuration provides accurate low power location detection that is substantially immune from multipath errors. Novel arbitration techniques allow location monitoring of many thousands of tags. The backhaul communication between beacons and the server preferably employs a low power communication technique such as WirelessHART®, ISA100, Zigbee® and Bluetooth® Low Energy, and LORA® based WAN, or others.

What is claimed is:

1. A two-way ranging based positioning system, comprising:
   a plurality of active tags each having a position;
   a plurality of fixed location beacons configured for location of a position of a tag of the plurality of active tags using two-way ranging on a first network; and
   a processing unit coupled via a data network separate from the first network to the plurality of beacons, the beacons configured to receive tag positions from the plurality of active tags on the first network, and the processing unit configured to receive position information of the plurality of active tags from the plurality of beacons on the data network and to determine and transfer ranging time slots to the plurality of beacons on the data network for two way ranging; and
   an application server configured to be operated by the processing unit;
   wherein the plurality of active tags and the plurality of beacons are synchronized continuously to a common time base for ranging during assigned time slots; and
   wherein the beacons and the tags perform two-way ranging therebetween in the assigned time slots by:
      ranging the active tag to at least a portion of the plurality of beacons during the beacon assigned ranging time slots; and
      reporting a position of the active tag to at least a beacon of the plurality of beacons; and
   wherein the application server configured to determine a position of an active tag by:
      providing the common time base for the plurality of fixed location beacons;
      receiving a synchronization message from each of the plurality of fixed location beacons in a fixed time slot for each beacon;
      registering the active tag to the common time base based on the received synchronization message; and
      receiving active tag ranging information from at least one of the plurality of beacons
      drift compensate the plurality of beacons and the active tag, using an internal clock count $B_c^n$ of a beacon synchronization message and an internal clock count $T_c^n$ of the active tag for a current update cycle n of the system, by determining a correction factor D to correct for clock drift versus the common time base using the formula $$D = \frac{T_c^n - T_c^{n-1}}{B_c^n - B_c^{n-1}};$$

and
   wherein time of flight between a beacon and the active tag is $T_f$, wherein a response delay between a beacon and an active tag is $T_d$, and wherein the application server is further configured to apply the correction factor to a two-way ranging round trip flight time as $T_{RT}=2T_f+T_d*D$.

2. The positioning system of claim 1, wherein each beacon of the plurality of beacons listens for a two-way ranging poll from a tag of the plurality of active tags in a predefined window.

3. The positioning system of claim 1, wherein the plurality of active tags has a global reporting time slot.

4. The positioning system of claim 1, wherein each tag of the plurality of active tags is configured to determine its position based on two-way ranging between it and at least one beacon of the plurality of beacons.

5. The positioning system of claim 4, wherein each tag of the plurality of tags is configured to determine its position based on two-way ranging between it and at least three beacons.

6. The positioning system of claim 1, wherein the processing unit is further configured to update positions of the plurality of tags at a rate dependent upon determined conditions of the tags.

7. The two-way ranging based positioning system of claim 1, wherein the application server is further configured to register the active tag by:
listening by the active tag for synchronization messages from the plurality of beacons;
sending a registration message upon receipt of a synchronization message from a beacon of the plurality of beacons;
receiving a confirmation message from the beacon of the plurality of beacons at the tag; and
initiating listening for a tag position report in a tag position report time slot.

8. The two-way ranging based positioning system of claim 1, wherein the application server is further configured to provide a synchronization message by providing the synchronization message within a range of predetermined beacon time synchronization time slots in an update cycle for the system.

9. The two-way ranging based positioning system of claim 1, wherein the application server is further configured to register the active tag by registering the active tag within a range of predetermined tag registration time slots in an update cycle for the system.

10. The two-way ranging based positioning system of claim 9, wherein the application server is further configured to range the active tag by ranging the active tag within a range of time slots in the update cycle after the tag registration time slots.

11. The two-way ranging based positioning system of claim 1, wherein the application server is further configured to range the active tag by:
issuing from the active tag a two-way ranging signal;
receiving at the active tag return signals from at least three beacons of the plurality of beacons; and
calculating a position of the active tag at the active tag using the common time base and the received return signals.

12. The two-way ranging based positioning system of claim 11, wherein the application server is further configured to issue a two-way ranging signal by issuing to a determined one of the plurality of beacons.

13. The two-way ranging based positioning system of claim 12, wherein the application server is further configured to range to more than one beacon of the plurality of beacons within an update cycle of the system.

14. The two-way ranging based positioning system of claim 11, wherein the application server is further configured to issue two-way ranging signals within a globally designated window in an update cycle of the system.

15. The two-way ranging based positioning system of claim 1, and the application server is further configured to: connect the plurality of beacons and the application server with a wireless communication network; and transfer mobile tag information from the plurality of beacons to the application server.

16. The two-way ranging based positioning system of claim 1, wherein the system monitors a plurality of tags, and the application server is further configured to update at least one tag of the plurality of tags at a rate slower than other tags, depending upon determined conditions of the at least one tag.

17. The system of claim 1, wherein the first network comprises an ultrawide band network.

18. A positioning system, comprising:
a plurality of active tags;
a plurality of fixed position beacons in communication with the plurality of active tags over a two-way ranging based network;
wherein each active tag of the plurality of active tags in the system has a globally designated window for two-way ranging polls between it and at least one of the plurality of beacons, wherein the plurality of beacons accepts two-way ranging polls within the globally designated window for each active tag, and wherein the plurality of active tags each report positions within a single global reporting time slot over the two-way ranging based network;
a processing unit coupled via a data network separate from the two-way ranging based network to the plurality of beacons, the processing unit configured to receive position information of the plurality of active tags from the plurality of beacons on the data network and to determine and transfer ranging time slots to the plurality of beacons on the data network for two-way ranging; and
an application server configured to be operated by the processing unit;
wherein the beacons and the tags perform two-way ranging therebetween in the assigned time slots by:
ranging the active tag to at least a portion of the plurality of beacons during the beacon assigned ranging time slots; and
reporting a position of the active tag to at least a beacon of the plurality of beacons; and
wherein the application server configured to determine a position of an active tag by:
providing the common time base for the plurality of fixed location beacons;
receiving a synchronization message from each of the plurality of fixed location beacons in a fixed time slot for each beacon;
registering the active tag to the common time base based on the received synchronization message; and
receiving active tag ranging information from at least one of the plurality of beacons
drift compensate the plurality of beacons and the active tag, using an internal clock count $B_c^n$ of a beacon synchronization message and an internal clock count $T_c^n$ of the active tag for a current update cycle n of the system, by determining a correction factor D to correct for clock drift versus the common time base using the formula $$D = \frac{T_c^n - T_c^{n-1}}{B_c^n - B_c^{n-1}};$$

and wherein time of flight between a beacon and the active tag is $T_f$, wherein a response delay between a beacon and an active tag is $T_d$, and wherein the application server is further configured to apply the correction factor to a two-way ranging round trip flight time as $T_{RT}=2T_f+T_d*D$.

19. The system of claim 18, wherein the two-way ranging based network comprises an ultrawide band network.

* * * * *